J. SONGNE.
LOG DOG PULLER.
APPLICATION FILED SEPT. 5, 1913.
1,111,105. Patented Sept. 22, 1914.
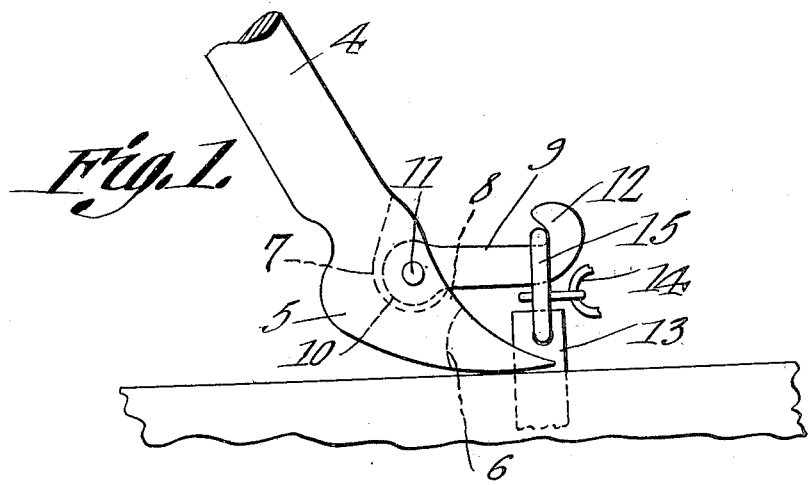
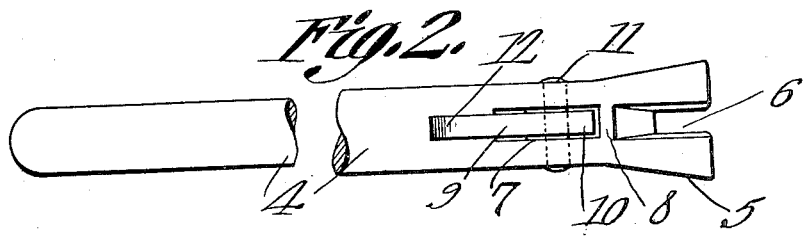
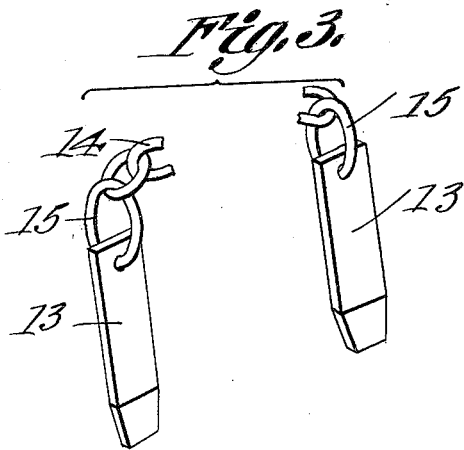
Witnesses
J. Songne
Inventor
by
Attorneys

UNITED STATES PATENT OFFICE.

JOSEPH SONGNE, OF JEANERETTE, LOUISIANA.

LOG-DOG PULLER.

1,111,105.

Specification of Letters Patent. Patented Sept. 22, 1914.

Application filed September 5, 1913. Serial No. 788,333.

*To all whom it may concern:*

Be it known that I, JOSEPH SONGNE, a citizen of the United States, residing at Jeanerette, in the parish of Iberia and State of Louisiana, have invented a new and useful Log-Dog Puller, of which the following is a specification.

The present invention appertains to a puller or extractor for chain dogs which are commonly employed in saw mills and the like, for handling logs, it being the object of the present invention to provide a lever or crowbar embodying novel and improved means for facilitating the withdrawal or extraction of such dogs from the logs into which they have been driven.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1 is a side elevation of the improved dog puller, as in use, a portion of the lever or crowbar being broken away. Fig. 2 is a plan view of the device, a portion of the lever being broken away, and the hook being thrown back. Fig. 3 is a perspective view of a pair of log dogs, a portion of the chain connecting them being broken away.

In carrying out the present invention, there is employed an ordinary or prevailing type of lever or crowbar 4, the lower end of which is provided with a curved shoe or cam 5. The tip of the cam 5 is bifurcated to provide the fork or claw 6, and the lever 4 is provided directly above the fork or claw 6 with a narrow and deep recess 7, an abutment 8 being formed between the recess 7 and the bifurcation or fork 6.

In connection with the lever, there is employed a flat hook 9 which has an eye 10 at its butt end fitting snugly between the sides of the recess 7, a pin or rivet 11 being passed through the side walls of the recess 7 to engage through the eye 10 to pivot the shank of the hook 9 to the lower end of the lever, above the tread or face of the cam 5. The hook 9 is provided at its free end with the bill 12 which is turned away from the cam 5. The abutment 8 is arranged to be engaged by the shank of the hook, whereby the hook will be supported at an angular position above the tip or end of the cam, the free end of the hook being spaced considerably from the tip of the cam as seen in Fig. 1.

In practice, the present device is employed for extracting log dogs, such as illustrated at 13, a pair of the dogs generally being connected by means of a short chain 14, the terminal links 15 of which are relatively large and are engaged to the butt ends of the dogs. The dogs 13 are preferably in the form of bars or flat pins, which are driven into the log to attach the chain 14 to the log for convenience in handling the log, as will be apparent to those versed in the art. Considerable difficulty is occasioned in withdrawing the dogs, according to prevailing practice, but the withdrawal of the dogs is rendered less difficult, by the employment of the improved device herein disclosed, as will presently appear.

In the use of the present implement, the bill 12 of the hook 9 is first engaged through the link 15 of the dog to be extracted, and the fork or claw 6 is then brought over the adjoining edge of the dog, with the cam 5 bearing against the log. The shank of the hook 9 is designed to contact with or rest against the abutment 8, in order that when the lever is depressed, the hook will be swung upwardly, so as to withdraw the dog in a convenient manner. In some instances, the extraction of the dog may be facilitated by engaging the fork or claw 6 under the link 15, although this is not ordinarily necessary.

The lever or crowbar 4 may be employed in the ordinary manner without the employment of the hook 9, by swinging the hook back as indicated in Fig. 2.

Having thus described the invention what is claimed as new is:—

An extracting implement embodying a lever having a cam at its lower end, and a recess above the tip of the cam, the tip of the cam being bifurcated, there being an abutment between the said recess and the bifurcation, and a hook having its butt end pivoted within the said recess, the shank of the hook being arranged to contact with the abutment to support the hook at an angular position above the tip of the cam, and the bill of the hook being turned away from the cam.

In testimony that I claim the foregoing as my own, I have hereto affixed my signature in the presence of two witnesses.

JOSEPH SONGNE.

Witnesses:
LEON LANDRY,
ALBERT MORESI.

Copies of this patent may be obtained for five cents each, by addressing the "Commissioner of Patents, Washington, D. C."